United States Patent [19]
Sansbury

[11] Patent Number: 5,276,555
[45] Date of Patent: Jan. 4, 1994

[54] FOCUS ADJUSTMENT ASSEMBLIES FOR PROJECTION TELEVISION

[75] Inventor: Blake E. Sansbury, Cincinnati, Ohio

[73] Assignee: Corning Incorporated, Corning, N.Y.

[21] Appl. No.: 984,305

[22] Filed: Nov. 23, 1992

[51] Int. Cl.⁵ ............................................. G02B 7/02
[52] U.S. Cl. ..................................... 359/826; 359/399; 359/425
[58] Field of Search ............... 359/822, 823, 825, 826, 359/829, 830, 399, 425, 426, 428, 429; 358/60

[56] References Cited

U.S. PATENT DOCUMENTS

| | | | |
|---|---|---|---|
| 1,970,593 | 8/1934 | Bigelow | 88/24 |
| 2,051,050 | 8/1936 | Langsner | 359/426 |
| 2,145,437 | 1/1939 | Thomas | 88/16.4 |
| 2,285,470 | 6/1942 | Stando et al. | 83/16.4 |
| 2,327,859 | 8/1943 | Bolsey | 95/44 |
| 2,489,578 | 11/1949 | Hillman | 359/426 |
| 2,843,010 | 7/1958 | Wally et al. | 88/24 |
| 2,843,013 | 7/1958 | Keuffel et al. | 359/426 |
| 3,051,045 | 8/1962 | Misuraca | 359/425 |
| 3,191,491 | 6/1965 | Pignone et al. | 88/24 |
| 3,538,832 | 11/1970 | Koeber | 95/44 |
| 5,045,930 | 9/1991 | Shinichi | 358/60 |

OTHER PUBLICATIONS

Photograph of a current USPL lens system which shows the currently used focus adjustment.

Primary Examiner—Loha Ben
Attorney, Agent, or Firm—Brian R. Leslie

[57] ABSTRACT

Focus adjustment assemblies for projection television are provided. Locking systems are also provided which lock the barrels of the projection television in position immediately after focusing and which have a reduced risk of warping the barrels.

15 Claims, 5 Drawing Sheets

FOCUS ADJUSTMENT ASSEMBLIES FOR PROJECTION TELEVISION

BACKGROUND OF THE INVENTION 1 FIELD OF THE INVENTION

This invention relates to focus adjustment assemblies for projection television.

HISTORY OF THE PRIOR ART

Projection television is a popular entertainment medium. Projection television comprises a projection cabinet and a screen. The projection cabinet may contain one or more cathode ray tubes (CRT's) and a system of lenses for each CRT. For a color projection television, the cabinet typically contains three CRT's, one for each of the primary colors—red, blue and green, and three lens systems, one for each CRT.

The lens systems of a projection television generally comprise at least three lenses. A first lens, usually of low power and which may have at least one aspheric surface, corrects for aberrations. A second, biconvex lens provides power to the image projection. A third, concave lens acts as a field flattener and corrects for field curvatures of the first and second lenses. Additional lenses may be added. A huge amount of research has gone into improving lens systems, and many complex systems have been developed.

Each lens system is part of a lens assembly. The lens assembly comprises two barrels, an outer barrel and an inner barrel. The inner barrel is situated to some degree within the outer barrel so that the barrels telescope. Each of the barrels includes at least one lens. The image is focused on the screen by moving the barrels relative to each other.

Obviously, it is important that the image is sharply focused on the screen. If the image is not focused, the most sophisticated lens system in the world is useless. Consumer projection televisions are typically designed with the intention that focusing is required only once upon assembly. However, even if the barrel assembly is accurately set, from time to time the image may move out of focus and require adjustment.

An optimal focus adjustment should be extremely sensitive (i.e.—allow for small variations in the relative spacing of the two barrels). In projection televisions with multiple lens assemblies, the focus adjustment should be sensitive enough that three images may be focused in concert. To avoid recurrent servicing, the focus adjustment should be mechanically simple and easy enough for the consumer to use. The focus adjustment should be inexpensive so as not to add greatly to the cost of the projection unit. Finally, the focus adjustment should include a locking mechanism that engages immediately after an adjustment has been made and that does not deform the barrels so as to degrade the lens performance.

Various mechanisms have been utilized to focus lenses or lens assemblies. U.S. Pat. No. 3,538,832 discloses a distance determining mechanism, for use in a camera having a focusable objective. To focus the objective lens a control lever is raised and a manual dial knob is rotated. The manual dial knob is fixed to a stub shaft having a pinion around its external end. The pinion meshes with a rack formed on an actuator member. Upon rotation of the knob, an actuator member moves about a shaft and adjusts a positioning pin which positions the lens cell of the objective lens. The complexity of this assembly is undesirable from both a manufacturing and servicing standpoint.

U.S Pat. No. 2,285,470 discloses a plural lens mount in which an inner lens box is longitudinally movable in an outer box via a rack, mounted on the inner box parallel to the longitudinal axis of the inner box and the outer box, and a pinion, connected to a rotatable knob. The sensitivity of this device is limited by the longitudinal orientation of the rack.

Current industry designs for focus adjustment include mechanical fasteners, such as wing nuts or plastic knobs, attached to a metal or plastic post. The post is attached to the inner barrel and travels along a slot in the outer barrel. Focusing is accomplished by moving the post along the slot, then tightening down the fastener creating interference between the outer barrel and the inner barrel. Focusing is performed manually and can be awkward because the post must be pushed along the slot. The mechanical fasteners used can result in overstressed lens mounts due to excessive tightening or lenses moving out of focus due to insufficient tightening.

U.S. Pat. No. 5,054,930 discloses a three tube color projection television in which a lens barrel carries protrusions on its sides. These protrusions are passed through inlets formed at two axially symmetrical places of a cylinder portion and are fitted into oblique guide slots in the side surface of the cylinder portion. To focus the image, the lens barrel is rotated relative to a barrel supporting portion to make the guide protrusions slide on side surfaces of the guide slots, so as to vary the distance between the lens barrel and a tube surface. To secure the barrel, a wire band is put on the cylinder portion and fastened with a screw. Here again, accurate focusing is made awkward because the barrels must be grasped. Fastening the wire band requires additional work and applies force between the inner and outer barrels.

Despite the devices discussed above and many additional attempts since the inception of projection television, a need still exists for a simple, inexpensive, easy to use, and sensitive focus adjustment device and a device which provides immediate locking that does not apply significant force between the inner and outer barrels which could deform the barrels.

SUMMARY OF THE INVENTION

The present invention provides a focus adjustment assembly that is simple, inexpensive, easy to use, and sensitive. Specifically, the present invention provides a focus adjustment assembly for use with a lens assembly on a projection television, the lens assembly including a first barrel and a second barrel wherein the first barrel is slidably positioned within the second barrel so that the barrels telescope and wherein each of the barrels includes at least one lens, the focus adjustment assembly comprising: a member rotatably mounted on one of the barrels for rotation a axis which is substantially radial to the barrel; track means disposed on the other barrel for engaging the periphery of the member, the track means being obliquely disposed with respect to the center line of the barrels; and base means for fixing either of the barrels to prevent its rotation, whereby the unfixed barrel moves in relation to the fixed barrel when the member is rotated so as to allow the lens assembly to be focused.

The present invention further provides focus adjustment assemblies with immediate locking systems that do not apply significant force between the inner and outer barrels which could deform the barrels. First, the present invention provides the focus adjustment assembly described in the previous paragraph further comprising engagement means movably connected to the member for causing frictional engagement of the member with the barrel to which the member is rotatably mounted so as to hold the member in position with the track means after focusing. A friction means, which may be made of an elastic material such as rubber, may be disposed between the member and the barrel to which the member is rotatably mounted so as to provide indirect friction between the member and the barrel. Second, the present invention provides the focus adjustment assembly described in the previous paragraph further comprising a strengthened interference fit between the barrels for holding the barrels in relative position after focusing.

It is an object of the present invention to provide a focus adjustment assembly which is mechanically simple.

It is a further object of the present invention to provide a focus adjustment assembly which allows sensitive adjustment of the lens assembly of a projection television.

It is a further object of the present invention to provide a focus adjustment assembly which is easy to use for consumer projection television users.

It is a further object of the present invention to provide a focus adjustment assembly which allows manual or driven focus adjustment on a projection television lens.

It is a further object of the present invention to provide a focus adjustment assembly which includes an immediate lock system.

It is a further object of the present invention to provide a focus adjustment assembly which includes a locking system that does not apply significant force between the inner and outer barrels which could deform the barrels.

DESCRIPTION OF THE PREFERRED EMBODIMENTS

Figure 1:
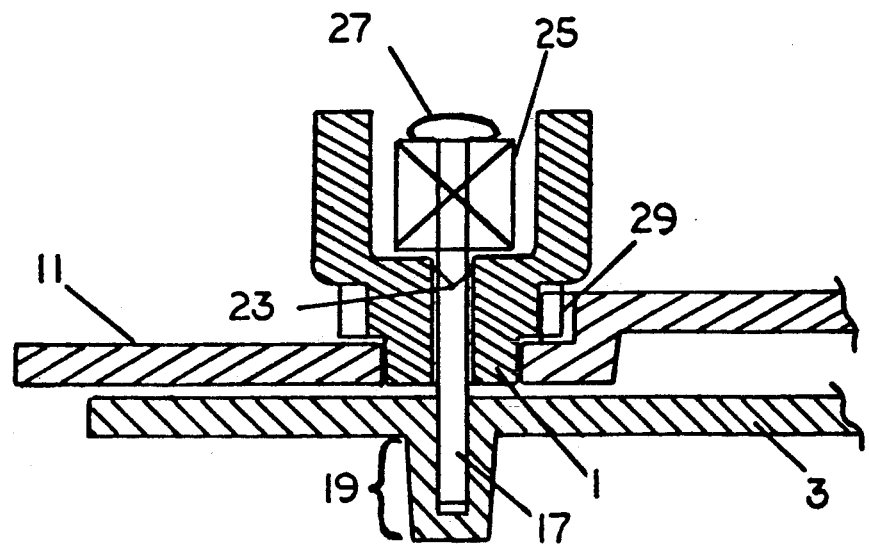
FIG. 1 is a cut-away top view of one embodiment of the engagement means of the present invention.

In a preferred embodiment of the present invention, the member is a pinion and the track means is a rack. The pinion rotates along the teeth of the rack. The fit of the teeth provides a sensitive calibration for the movement of the barrels and indirectly engages the barrels. The rack is disposed on the outer barrel and the pinion rotatably mounted on the inner barrel. However, the rack may be disposed on the inner barrel and the pinion rotatably mounted on the outer barrel. The outer barrel is preferably fixed to the base means, though either barrel may be so fixed.

The pinion is preferably integral with a knob at one end. The knob extends from the outer barrel to allow for easy focus adjustment by rotating the knob. This makes focusing much less awkward than grasping the entire barrel or pushing a post along a slot. The knob may also serve as an attachment bolt for a motor driven system. Typically, an auto focus device would be attached to the knob in the production plant immediately after assembly of the unit. The lens assembly would be focused and locked in anticipation of sale. The consumer would then utilize manual focusing when necessary. However, an auto focus device could be attached after sale to provide continued automatic focusing. Furthermore, a remotely controlled motor drive could be attached to provide remotely controlled focusing.

Because the rack is disposed on the selected barrel oblique with respect to the center line of the barrels, the barrels will rotate with respect to each other as the pinion is turned. The present focus adjustment assembly allows for increased sensitivity compared to previous devices utilizing solely longitudinal movement. More turns of the pinion are required to move the barrels a given relative distance compared to if the rack was disposed longitudinally. The greater the angle at which the rack is disposed with respect to the center line of the barrels, the more sensitive the adjustment possible. The rack is preferably disposed at an angle of from about 80° to about 85° with the center line of the barrels. However, the angle at which the rack is disposed may be changed to meet the specific needs of any given lens assembly.

In one embodiment of the present invention, the focus adjustment assembly includes engagement means. The engagement means preferably comprise a shaft, disposed within an opening in the center of the member and accepted by a slot in one of the barrels so as to rotatably mount the member on the barrel, and a compression spring, disposed around the shaft so as to urge the member against the barrel. By lifting up the member slightly, rotation becomes easy and fluid. As soon as the member is released, the spring urges the member against the barrel to which it is mounted. Frictional engagement between the barrel and the member holds the member in position. Engagement of the member by the track means locks the barrels in relative position.

A friction means may be disposed between the member and the barrel to which the member is rotatably mounted. The friction means is preferably a washer disposed around the shaft and between the member and the barrel so as to provide indirect friction between the member and the barrel through the washer. The washer is preferably made of an elastic material such as rubber. The washer provides additional frictional force for holding the member and the barrel in relative position.

Frictional engagement of the washer with the barrel and the member holds the member in position. Engagement of the member by the track means locks the barrels in relative position. In this way the barrels are immediately locked in their adjusted relative positions.

It will be appreciated that variations of the engagement means described above are possible. For example, the shaft may be threaded on one end to engage the barrel. The beneficial characteristics of the engagement means of the present invention are that engagement occurs immediately after focusing and that no significant force is placed between the inner and outer barrels, reducing the danger of deforming the barrels during focus adjustment.

The barrels of a lens assembly are typically held in radial relation to each other by a slight interference fit. This interference fit usually comprises a series of features on the outside of the inner barrel and on the inside of the outer barrel within a particular longitudinal segment of overlap. These features frictionally engage each other. For example, a series of flats on a mid-section of the inner barrel can frictionally engage a series of beads on an end section of the outer barrel, or vice-versa depending upon the orientation of the telescope arrangement. These features allow movement but prevent excess slippage. The engagement means described above can be used in concert with a slight interference fit, the slight interference holding the barrels in relative radial position, and the engagement means locking the barrels in relative longitudinal position.

Another embodiment of the present invention comprises a locking method distinct from the engagement means discussed above, but still providing immediate locking which does not apply significant force between the inner and outer barrels. This embodiment utilizes a strengthened interference fit. The strengthened interference fit comprises a first series of features disposed on the inner barrel and a second series of features disposed on the outer barrel, the first series of features and the second series of features frictionally engaging each other so as to prevent movement of the barrels when the member is not being moved along the track means. The features of the strengthened interference fit frictionally engage each other, as do the slight interference means described above. However, in the strengthened interference fit the features frictionally engage each other to a greater degree, locking the barrels into relative position when the member is not being moved along the track means. The features on the inner or outer barrels may be any features providing the required frictional engagement, including, for example, flats, beads, ribs, rings, pads, and combinations thereof. The frictional engagement of the features is distributed uniformly over a load forming circle on the barrels. In this way the frictional engagement does not pull the barrels off center so as to warp the barrels.

Figure 3:
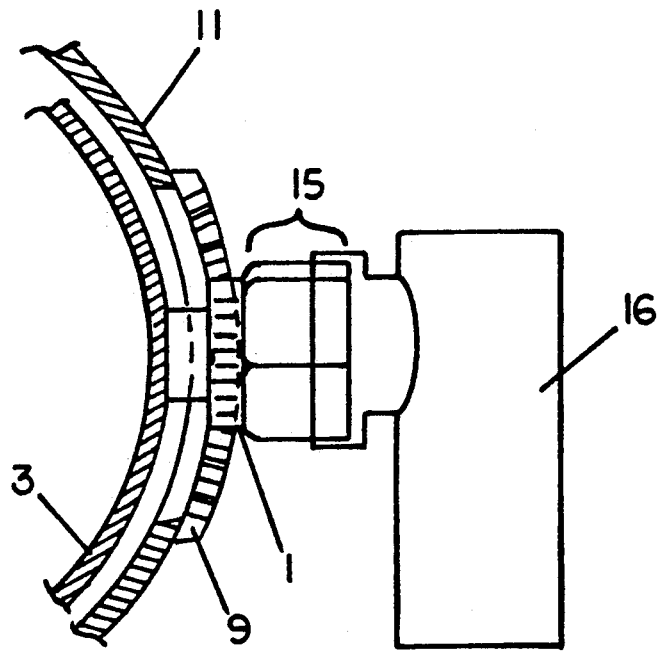
FIG. 3 is a top view of an embodiment of a rack and pinion assembly of the present invention.

Several embodiments of the present invention are described below with reference to the figures. A top view of an embodiment of a rack and pinion assembly of the present invention is shown in FIG. 3. The pinion 1 is rotatably mounted on the inner barrel 3. The rack 9 is disposed on the outer barrel 11 which is fixed to the base means (not shown). One end of pinion 1 is integral with a knob 15 which extends from the outer barrel 11 to allow for manual adjustment. Optional motor drive means 16, shown schematically, is removably connected to knob 15, for automatically turning pinion 1.

Figure 5:
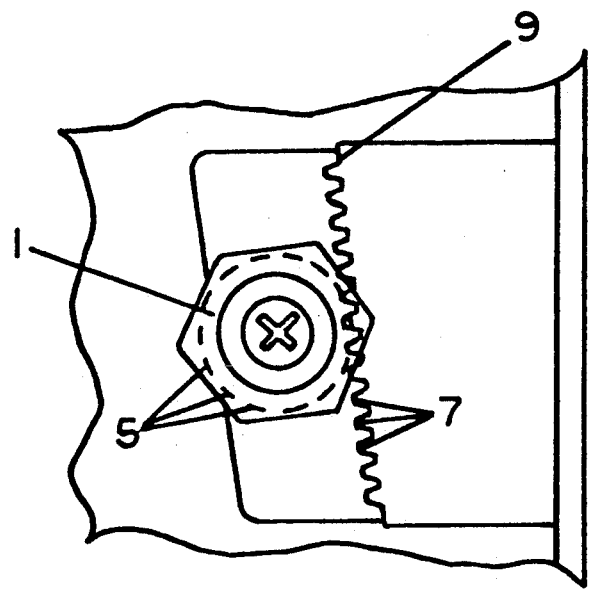
FIG. 5 is a partially phantom view of a rack and pinion assembly of the present invention.

FIG. 5 illustrates the engagement of the rack 9 and pinion 1 of the present invention. The teeth 5 of the pinion 1 mesh with the teeth 7 of the rack 9 so as to allow the pinion 1 to be turned along the rack 9. This causes the inner barrel 3 to rotate and move longitudinally with respect to the outer barrel 11.

Figure 2:
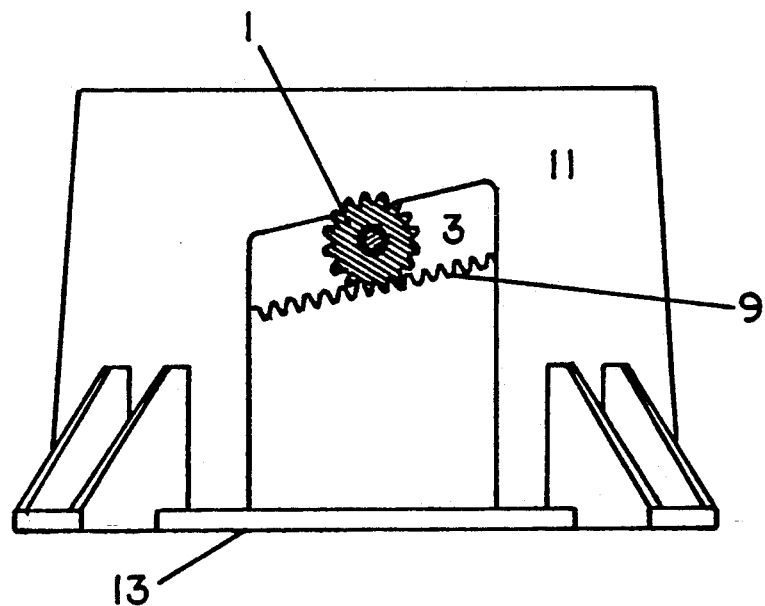
FIG. 2 is a partial side view of an embodiment of the present invention showing a rack and pinion assembly.

A partial side view of an embodiment of the present invention is illustrated in FIG. 2 is disposed on outer barrel 11. Pinion 1 is rotatably mounted on inner barrel 3. As pinion 1 turns on rack 9, inner barrel 3 is forced away from base 13.

Figure 6A:
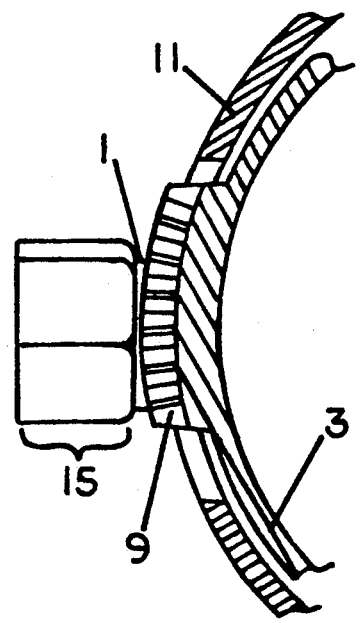
FIG. 6A is a top view of a rack and pinion assembly of an embodiment of the present invention wherein the rack is mounted on the inner barrel and the pinion is rotatably mounted on the outer barrel.
Figure 6B:
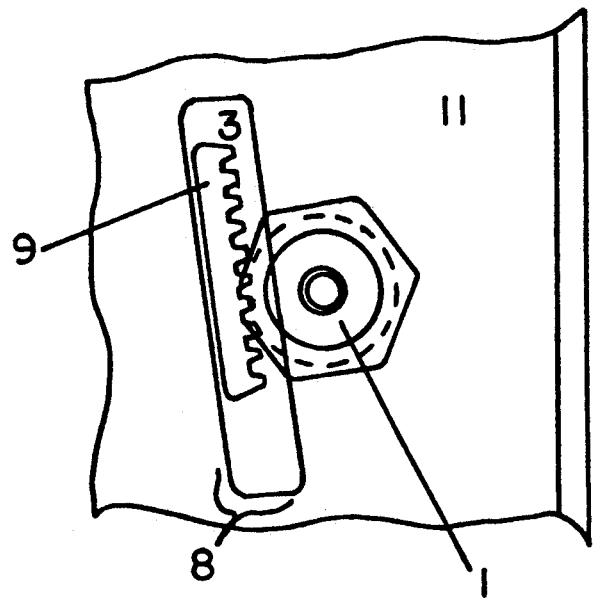
FIG. 6B is a partially phantom side view of a rack and pinion assembly of an embodiment of the present invention wherein the rack is mounted on the inner barrel and the pinion is rotatably mounted on the outer barrel.
Figure 6C:
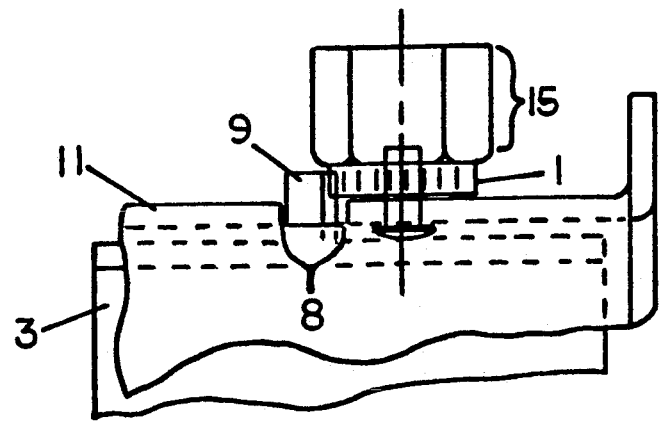
FIG. 6C is a partially phantom top view of a rack and pinion assembly of an embodiment of the present invention wherein the rack is mounted on the inner barrel and the pinion is rotatably mounted on the outer barrel. 15

FIG. 6A illustrates an embodiment of the present invention wherein pinion 1 is rotatably mounted on outer barrel 11, and rack 9 is disposed on inner barrel 3. As shown in FIG. 6B and FIG. 6C, rack 9 extends from inner barrel 3 through a focus slot 8 in outer barrel Il to engage pinion 1.

FIG. 1 is a cut-away top view of the present invention illustrating one embodiment of the engagement means. Shaft 17 is disposed within an opening 23 in pinion 1 and is accepted by slot 19 in inner barrel 3 so as to rotatably mount pinion 1 on inner barrel 3. Compression spring 25 is disposed around shaft 17 and between head 27 of shaft 17 and pinion 1 so as to urge pinion 1 against inner barrel 3. Frictional engagement of pinion 1 with inner barrel 3 causes pinion 1 to be locked into position after focusing. Engagement of locked pinion 1 with rack 29 locks inner barrel 3 and outer barrel 11 in relative position.

Figure 7:
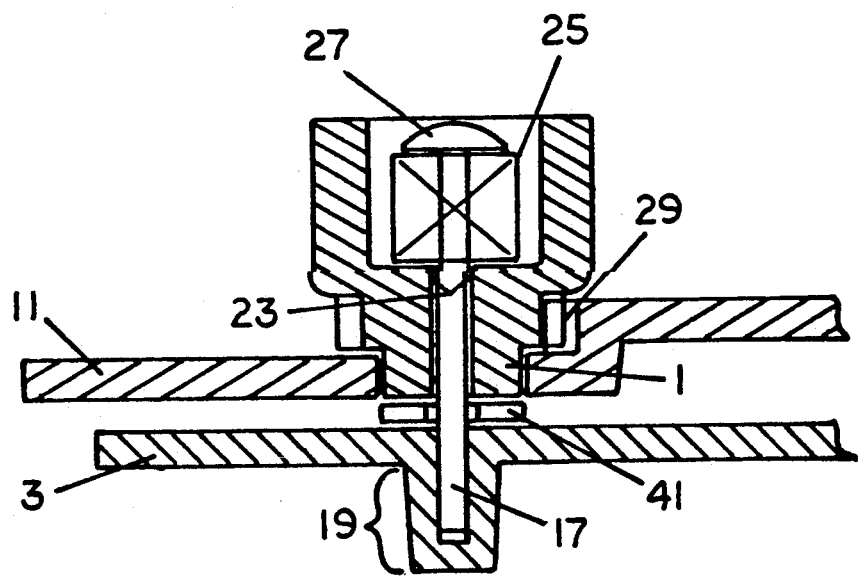
FIG. 7 is a cut-away top view of one embodiment of the engagement means of the present invention.

FIG. 7 is a cut-away top view of the present invention illustrating another embodiment of the engagement means. Shaft 17 is disposed within an opening 23 in pinion 1 and is accepted by slot 19 in inner barrel 3 so as to rotatably mount pinion 1 on inner barrel 3. Washer 41 is disposed around shaft 17 and between pinion 1 and inner barrel 3. Compression spring 25 is disposed around shaft 17 and between head 27 of shaft 17 and pinion 1 so as to urge pinion 1 against washer 41 and to urge washer 41 against barrel 3. Frictional engagement of washer 41 with pinion 1 and inner barrel 3 causes pinion 1 to be locked into position after focusing. Engagement of locked pinion 1 with rack 29 locks inner barrel 3 and outer barrel 11 in relative position.

Figure 4A:
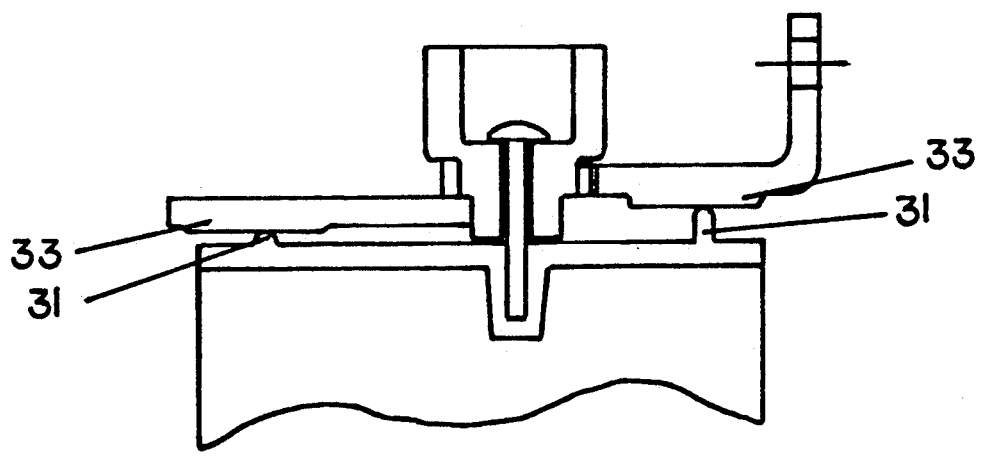
FIG. 4A and FIG. 4B are cross-sectional illustrations of a strengthened interference fit of the present invention.
Figure 4B:
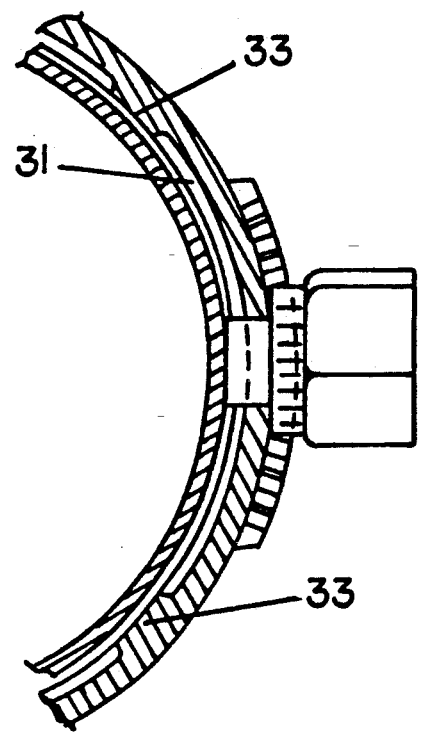

FIG. 4A and FIG. 4B are cross-sectional illustrations of a strengthened interference fit of the present invention. A series of beads 31 are disposed on inner barrel 3. A series of ribs 33 are disposed on outer barrel 11. Beads 31 and ribs 33 frictionally engage each other so as to prevent the movement of the barrels 3 and 11 when an adjustment is not being made. However, the frictional engagement of barrels 3 and 11 is weak enough to be overridden by rotating the member along the track means (not shown).

Although the present invention has been shown and described with respect to detailed embodiments thereof, it will be understood by those skilled in the art that various changes in the form and detail thereof may be made without departing from the spirit and scope of this invention.

I claim:

1. A focus adjustment assembly for use with a lens assembly on a projection television, said lens assembly including a first barrel and a second barrel wherein said first barrel is slidably positioned within said second barrel so that said barrels telescope and wherein each of said barrels includes at least one lens, said focus adjustment assembly comprising:

(a) a member rotatably mounted on one of said barrels for rotation about an axis which is substantially radial to said one of said barrels;

(b) track means disposed on the other of said barrels for engaging the periphery of said member, said track means being obliquely disposed with respect to the center line of said barrels;

(c) base means for fixing either of said barrels to prevent its rotation, whereby said unfixed barrel moves in relation to said fixed barrel when said member is rotated so as to allow said lens assembly to be focused.

2. The focus adjustment assembly of claim 1, further comprising:

engagement means movably connected to said member for causing frictional engagement of said member with said one of said barrels to which said member is rotatably mounted so as to hold said member in position with said track means after focusing.

3. The focus adjustment assembly of claim 2, wherein said engagement means comprises a shaft, disposed within an opening in the center of said member and accepted by a slot in said one of said barrels so as to rotatably mount said member on said one of said barrels, and a compression spring, disposed around said shaft so as to urge said member against said one of said barrels.

4. The focus adjustment assembly of claim 3, further comprising friction means, disposed between said member and said one of said barrels so as to provide indirect friction between said member and said one of said barrels through said friction means.

5. The focus adjustment assembly of claim 4, wherein said friction means is a washer, disposed around said shaft and between said member and said one of said barrels, so as to frictionally engage said member and said one of said barrels.

6. The focus adjustment assembly of claim 5, wherein said washer is made of rubber.

7. The focus adjustment assembly of claim 1, wherein said member is a pinion and said track means is a rack, said pinion rotatable along the teeth of said rack.

8. The focus adjustment assembly of claim 7, wherein said rack is disposed on said outer barrel and said pinion is rotatably mounted on said inner barrel.

9. The focus adjustment assembly of claim 7, wherein said rack is disposed on said inner barrel and said pinion is rotatably mounted on said outer barrel.

10. The focus adjustment assembly of claim 7, wherein said pinion is integral with a knob at one end, which knob extends from said outer barrel so as to allow for manual adjustment.

11. The focus adjustment assembly of claim 10, further comprising:

motor drive means, attached to said knob, for automatically turning said pinion.

12. The focus adjustment assembly of claim 7, wherein said rack is disposed on said one of said barrels at an angle of from about 80° to about 85° with said center line of said barrels.

13. The focus adjustment assembly of claim 7, wherein said outer barrel is fixed to said base means.

14. The focus adjustment assembly of claim 1, further comprising:

a first series of features disposed on said inner barrel and a second series of features disposed on said outer barrel, said first series of features and said second series of features frictionally engaging each other so as to prevent movement of said barrels when said member is not being moved along said track means.

15. The focus adjustment assembly of claim 14, wherein said first series of features and said second series of features are independently selected from the group consisting of flats, beads, ribs, rings, pads, and combinations thereof.

* * * * *